US012621307B1

(12) United States Patent
Wu et al.

(10) Patent No.: US 12,621,307 B1
(45) Date of Patent: May 5, 2026

(54) UNIFIED IDENTITY AND ACCESS MANAGEMENT SOLUTION FOR FEDERATED LEGAL ENTITIES WITH HYBRID CLOUD INFRASTRUCTURE

(71) Applicant: Morgan Stanley Services Group Inc., New York, NY (US)

(72) Inventors: Jun Wu, Shanghai (CN); Fan Liu, Singapore (SG); James McGuire, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 72 days.

(21) Appl. No.: 18/736,043

(22) Filed: Jun. 6, 2024

(51) Int. Cl.
*H04L 29/00* (2006.01)
*H04L 9/40* (2022.01)

(52) U.S. Cl.
CPC ........ *H04L 63/107* (2013.01); *H04L 63/0218* (2013.01); *H04L 63/102* (2013.01); *H04L 63/20* (2013.01)

(58) Field of Classification Search
CPC . H04L 63/107; H04L 63/0218; H04L 63/102; H04L 63/20
See application file for complete search history.

(56) References Cited

U.S. PATENT DOCUMENTS

| | | | | |
|---|---|---|---|---|
| 6,636,721 | B2 * | 10/2003 | Threadgill ......... | H04B 7/18539 455/12.1 |
| 7,152,045 | B2 * | 12/2006 | Hoffman ................. | G07F 7/025 235/382 |
| 7,494,060 | B2 * | 2/2009 | Zagami .................... | G07C 9/27 235/382 |
| 7,634,764 | B2 * | 12/2009 | Heinz ........................ | G06F 8/30 717/136 |
| 7,822,708 | B1 * | 10/2010 | Mathew ................ | G06F 16/288 707/610 |
| 7,889,052 | B2 * | 2/2011 | Berardi ................. | G06Q 20/14 235/382 |
| 7,934,102 | B2 * | 4/2011 | Aull ........................ | G06Q 10/00 380/46 |
| 8,108,914 | B2 * | 1/2012 | Hernoud ................. | H04L 63/20 726/19 |
| 8,935,311 | B2 * | 1/2015 | Hannel ............... | H04L 63/0218 709/200 |
| 9,608,810 | B1 | 3/2017 | Ghetti et al. | |

(Continued)

*Primary Examiner* — Don G Zhao
(74) *Attorney, Agent, or Firm* — K&L Gates LLP

(57) ABSTRACT

Distributed computer system for multi-national enterprise comprises a parent Identity Governance and Administration (IGA) system; a parent HR system in communication with the parent IGA system; a parent LDAP system in communication with the parent HR system; a child IGA system; a child HR system in communication with the child IGA system; a child LDAP system in communication with the child HR system; and a child IGA integrator coupled between the child IGA system and the child LDAP system to integrate the child LDAP system and the child IGA system. System also comprises an HR data integrator in communication with the parent HR system and the child HR system to share data between the parent HR system and the child HR system within constraints of laws and regulations of the first and second countries of parent and child and generates a unified identifier for an employee to identify the employee.

15 Claims, 2 Drawing Sheets

(56)  References Cited

U.S. PATENT DOCUMENTS

| | | | | |
|---|---|---|---|---|
| 11,310,041 B2 * | 4/2022 | Huang | H04L 9/0861 |
| 12,001,978 B1 * | 6/2024 | Keane | G06Q 10/063118 |
| 2003/0229783 A1 * | 12/2003 | Hardt | H04L 63/102 |
| | | | 713/155 |
| 2004/0123153 A1 * | 6/2004 | Wright | G06F 11/30 |
| | | | 380/258 |
| 2005/0138380 A1 * | 6/2005 | Fedronic | G07C 9/27 |
| | | | 713/172 |
| 2009/0328070 A1 * | 12/2009 | Paknad | G06Q 10/06 |
| | | | 719/318 |
| 2014/0289791 A1 | 9/2014 | Acharya et al. | |
| 2015/0200950 A1 | 7/2015 | Meunier et al. | |
| 2016/0042470 A1 * | 2/2016 | Shaaban | G06Q 10/1091 |
| | | | 705/30 |
| 2016/0112208 A1 * | 4/2016 | Williams | H04L 9/3268 |
| | | | 713/176 |
| 2016/0210572 A1 * | 7/2016 | Shaaban | G06Q 40/12 |
| 2016/0337347 A1 * | 11/2016 | DeWeese | H04L 63/083 |
| 2018/0075247 A1 * | 3/2018 | Campero | H04L 63/0853 |
| 2018/0091516 A1 * | 3/2018 | Nixon | G06Q 10/06 |
| 2018/0109430 A1 | 4/2018 | Quintas et al. | |
| 2019/0068608 A1 * | 2/2019 | Boland | H04L 63/123 |
| 2019/0075135 A1 * | 3/2019 | Hernoud | G06F 21/35 |
| 2019/0138744 A1 * | 5/2019 | Ruggiero | H04L 63/0807 |
| 2020/0153868 A1 * | 5/2020 | Hernoud | G06K 19/06028 |
| 2020/0322142 A1 * | 10/2020 | Huang | H04L 9/3236 |
| 2021/0089665 A1 | 3/2021 | Eberlein | |
| 2021/0182423 A1 * | 6/2021 | Padmanabhan | H04L 9/3271 |
| 2021/0352077 A1 | 11/2021 | Benedetti et al. | |
| 2021/0392142 A1 | 12/2021 | Stephens et al. | |
| 2022/0050921 A1 | 2/2022 | LaFever et al. | |
| 2022/0358240 A1 * | 11/2022 | Neal | G06F 21/6245 |
| 2023/0074653 A1 | 3/2023 | Mawson | |
| 2023/0164189 A1 * | 5/2023 | Danilchenko | H04L 63/10 |
| | | | 726/1 |
| 2023/0214925 A1 * | 7/2023 | Cella | G06Q 30/06 |
| | | | 705/37 |
| 2023/0308450 A1 * | 9/2023 | Yoon | H04L 63/102 |
| 2025/0106237 A1 * | 3/2025 | Ghosh | H04W 12/12 |
| 2025/0202903 A1 * | 6/2025 | Fry | H04L 63/105 |

* cited by examiner

UNIFIED IDENTITY AND ACCESS MANAGEMENT SOLUTION FOR FEDERATED LEGAL ENTITIES WITH HYBRID CLOUD INFRASTRUCTURE

BACKGROUND

Many countries have local laws pertaining to cross-border data transfer, e.g., the sharing of data from that country to an entity or person in another country. Such laws can complicate operations for a global entity, which can comprise federated legal entities across multiple countries. The complications can involve complying with the data protection laws and regulations of each country where the global company operates. Another complication is that cross-border data transfers can increase the risk of cyber-attacks and data breaches.

SUMMARY

In one general aspect, the present invention is directed to a distributed computer system for a global enterprise that comprises a parent entity and a child entity, where the parent entity operates in a first country and the child entity operates in a second country that is different from the first country. The distributed computer system can comprise, according to various embodiments: a parent Identity Governance and Administration (IGA) system; a parent HR system in communication with the parent IGA system; a parent LDAP system in communication with the parent HR system; a child IGA system; a child HR system in communication with the child IGA system; a child LDAP system in communication with the c child HR system; and a child IGA integrator that is coupled between the child IGA system and the child LDAP system and that integrates the child LDAP system and the child IGA system. The distributed computer system also comprises an HR data integrator in communication with the parent HR system and the child HR system. The HR data integrator shares data between the parent HR system and the child HR system within constraints of laws and regulations of the first and second countries. The HR data integrator also generates a unified identifier for an employee, where the unified identifier identifies the employee.

For example, the HR data integrator can receive employee data from the child HR system and upload the employee data to the parent HR system to update the employee data for the employee identified by the unified identifier. The HR data integrator can also be configured to send the unified identifier from the parent HR system to the child HR system. The child IGA can also be configured to collect information associated with the employee. In response to the employee being transferred, the child IGA system can trigger a worker transfer process. In response to the employee being terminated, the child IGA system triggers a termination process, such as revoking worker privileges for the terminated employee. Where the employee is a new employee, the IGA system collects information associated with the unified identifier and the IGA integrator can create an LDAP at least one account for the new employee. The distributed computer system can further comprise at least one child application, where the LDAP is configured to control access to the at least one child application for the employee based on unified identifier of the employee.

In various embodiments, therefore, the interactions and communications between legal entities are exceptional based, and strictly controlled by the IAM mechanism crossboard. The unified IAM solution can integrate with the whole eco-system by leveraging Identity Federation capability as well as integrating with HR system with a consistent process while remaining autonomous operationally in each legal entity. The deployment method can also provide flexibility, with each component being deployable either on-premises or on-cloud. These and other features of the applicant's teachings are set forth herein.

DESCRIPTION OF THE FIGURES

Various embodiments of the present invention are described herein by way of example in conjunction with the following figures.

DESCRIPTION

In one general aspect, the present invention relates to unified identify and access management solutions for a global company that operates in multiple countries. Local cybersecurity laws and industrial regulations often set strict requirements on cross-border data transfer. The present invention, in one general aspect, creates a physical IT segregation between legal entities from different jurisdictions of the global company. In general, by default, no data are shared across legal entities. Yet employee information in a global company requires shared access across different legal entities. Thus, the present disclosure sets up different HR systems between legal entities but with data sharing within the confined scoped defined by laws and regulations.

In addition, some business data are required to be shared among different legal entities within the global company. The present invention can, in various embodiments, set data access rules between legal entities on an exceptional basis. For example, all cross-entity authentication can require cloud identity federation with strict control.

A global company might also employ a unified Identity Governance and Administration (IGA) process while each legal entity operates autonomously. IGA enables security administrators to efficiently manage user identities within the global company and access across the enterprise. IGA improves the security administrator's visibility into identities and access privileges and helps them implement the necessary controls to prevent inappropriate or risky access to data or systems of the enterprise. In embodiments of the present invention, assuming a structure that involves a parent legal entity and a child legal entity, the child legal entity lacks access to information on the parent legal entity as parent and child data centers that store information are fully separated. The structure can be expanded to include multiple federated legal entities.

Figure 1:
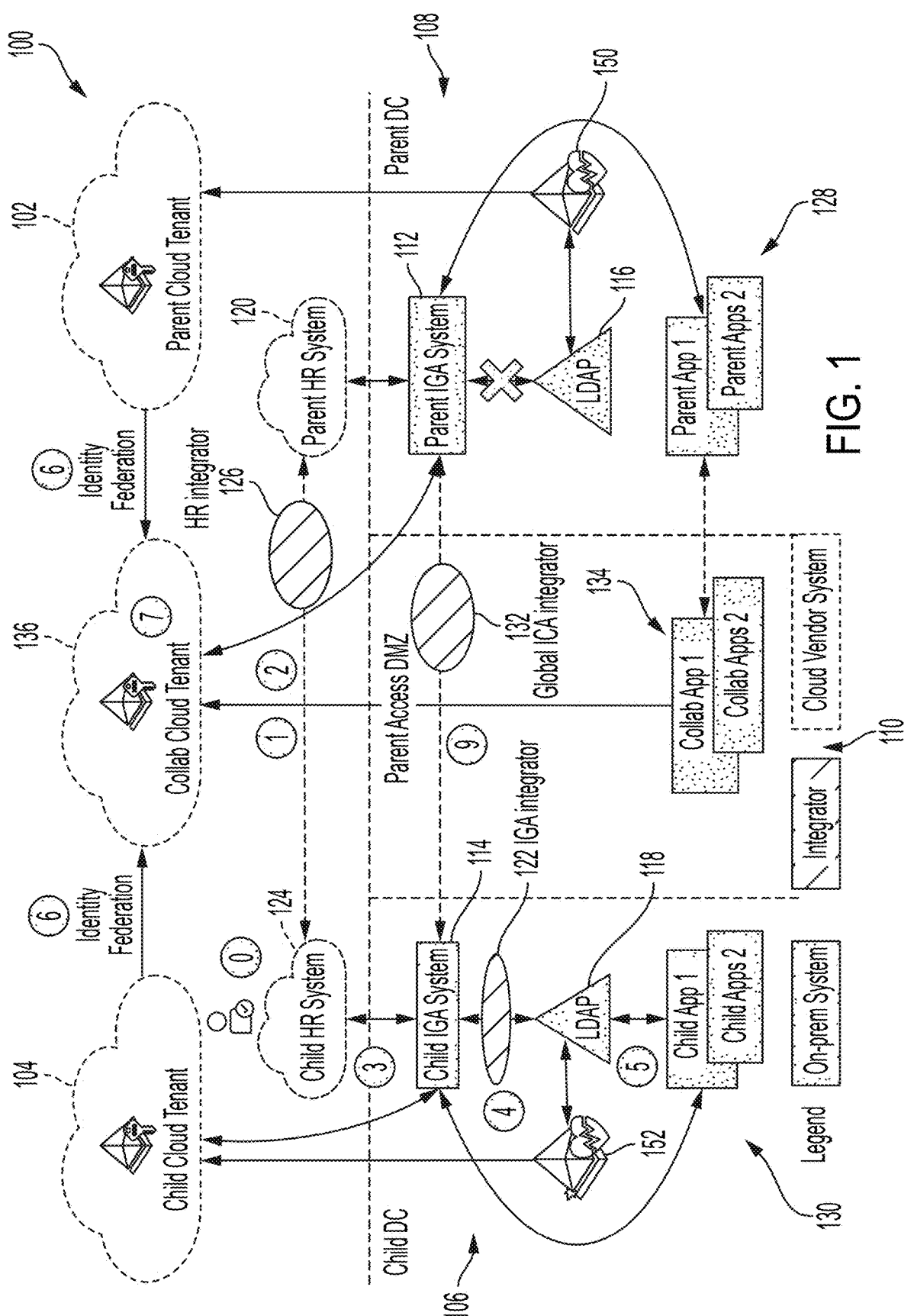
FIG. 1 is a distributed computer system for a global enterprise, according to an exemplary embodiment of the disclosure.

With reference now to the figures, FIG. 1 depicts a distributed computer system 100 for a global enterprise (e.g., company), according to an exemplary embodiment of the present invention. The distributed computer system 100 comprises a parent entity and a child entity, where the parent entity operates in a first country and the child entity operates in a second country that is different from the first country. The distributed computer system 100 comprises three Tenants: a Child Tenant 104 that serves Child Legal Entity; a Parent Tenant 102 that serves the Parent Legal Entity; and a Collaboration Tenant 136 that is coupled between the Child Tenant 104 and the Parent Tenant 102. In one embodiment, the three Tenants may be implemented on a cloud. In cloud computing, "tenancy" refers to the sharing in a private or public environment of computing services that is distinct from other users and kept invisible.

The distributed computer system 100 comprises two Data Centers for the two Legal Entities respectively: a Child Data Center 106 and a Parent Data Center 108. The Child Data Center 106 serves the Child Legal Entity and the Parent Data Center 108 serves the Parent Legal Entity. The data centers 106, 108 are fully segregated physically to satisfy regulatory and cyber security requirements. Access from the Child Data Center 106 to the Parent Data Center 108 requires an intermediary. For example, some of the business users in the Child Data Center 106 might need to access data in the Parent Data Center 108. In one embodiment, this can be done with strict security controls. For example, the distributed system 100 can utilize a Parent Data Center Demilitarized Zone 110 (DMZ) to serve the outside access from Child Data Center 106. The Collaboration Cloud Tenant 102 is used for collaborating the child entity and the parent entity on the cloud, or used as an Identity Provider to access on-premises applications in a Parent Data Center DMZ 110.

The parent data center 108 can comprise, in various embodiments, a parent Identity Governance and Administration 112 (IGA) system. A parent HR system 120 can be in communication with the parent IGA system 112. The distributed computer system 100 further comprises a parent lightweight directory access protocol (LDAP) system 116. The Parent HR System 120 implements the HR system for Parent Legal Entity. The parent IGA system 116 manages user identities and access across the parent. The parent LDAP system 116 is a system to query employee information from the parent IGA system 116. The parent data center 108 further comprises one or more parent applications 128. The parent applications can be any software-based applications run by the parent entity in performance of the operations of the global enterprise.

The child data center 106 can comprise a child IGA system 114; a child HR system 124 that is in communication with the child IGA system 114; a child LDAP system 118; and a child IGA integrator 122 that integrates the child LDAP system 118 and the child IGA system 114. The Child HR System 124 can implement the Human Resource (HR) system for Child Legal Entity. The child IGA system 114 can manage user identities and access across the child entity. The child LDAP system 114 can query user information from the child IGA system 114 via the child IGA integrator 122. For example, the child IGA integrator 122 can create the corresponding LDAP account, email account, and other accounts for a new employee for the child entity. The child data center 106 can further comprise one or more child application(s) 130 and the child LDAP system 118 can control access to the child application(s) 130 to authorized users. The child application(s) 130 can be a software application run by the child entity as part of the child entity's operations.

The Parent Data Center DMZ 110 can comprise a global IGA integrator 132 and collaboration tenant applications 134. The global IGA integrator 132 can communicate between the parent IGA system 112 and the child IGA system 114. The collaboration application(s) 134 communicates with the collaboration cloud tenant 136 and the parent applications 128.

The distributed computer system 100 can further comprise an HR data integrator 126 in communication with the parent HR system 120 and the child HR system 124. The HR data integrator 126 shares data between the parent HR system 120 and the child HR system 124 within constraints of laws and regulations of the first and second countries.

In one embodiment, at least one of the distributed computer system 100, the parent HR system 120, and the child HR 124 system may be a cloud-based system. Each system of the distributed computer system may be a cloud-based system or an on-premises system.

The parent HR system 120 can be configured to generate a unified identifier for a new employee of the parent entity. The unified identifier can be used to identify the employee at the child HR system 124 and the parent HR system 120.

When either of new employee joins ("joiner") the child joiner or an employee of the child moves or leaves ("mover/leaver"), the HR data are updated on the Child but not the parent without an intermediary. For example, the Child HR System uploads the Joiner/Mover/Leaver data to Parent HR System via an HR integrator 126 (an intermediary between the Child and Parent).

The applications in FIG. 1 are flexible in terms of being deployed on-premises or on-cloud. For example, the HR systems 120, 124 can be deployed via SaaS (software as a service) (e.g., cloud) or on-premises solutions, and the IGA system 112, 114 similarly can be deployed via SaaS or on-premises solutions.

The distributed computer system 100 can also comprise, as shown in FIG. 1, a connector 150 between the parent LDAP 116 and the parent cloud tenant 102; and a connector 152 between the child LDAP 118 and the child cloud tenant 104. The connectors 150, 152 may be implemented, for example, with Azure AD connectors, that synchronize on-premises objects present in Active Directory (e.g., LDAPs 116 and 118) to a corresponding Azure AD service within a Microsoft 365 tenant (e.g., cloud tenants 102, 104).

Figure 2:
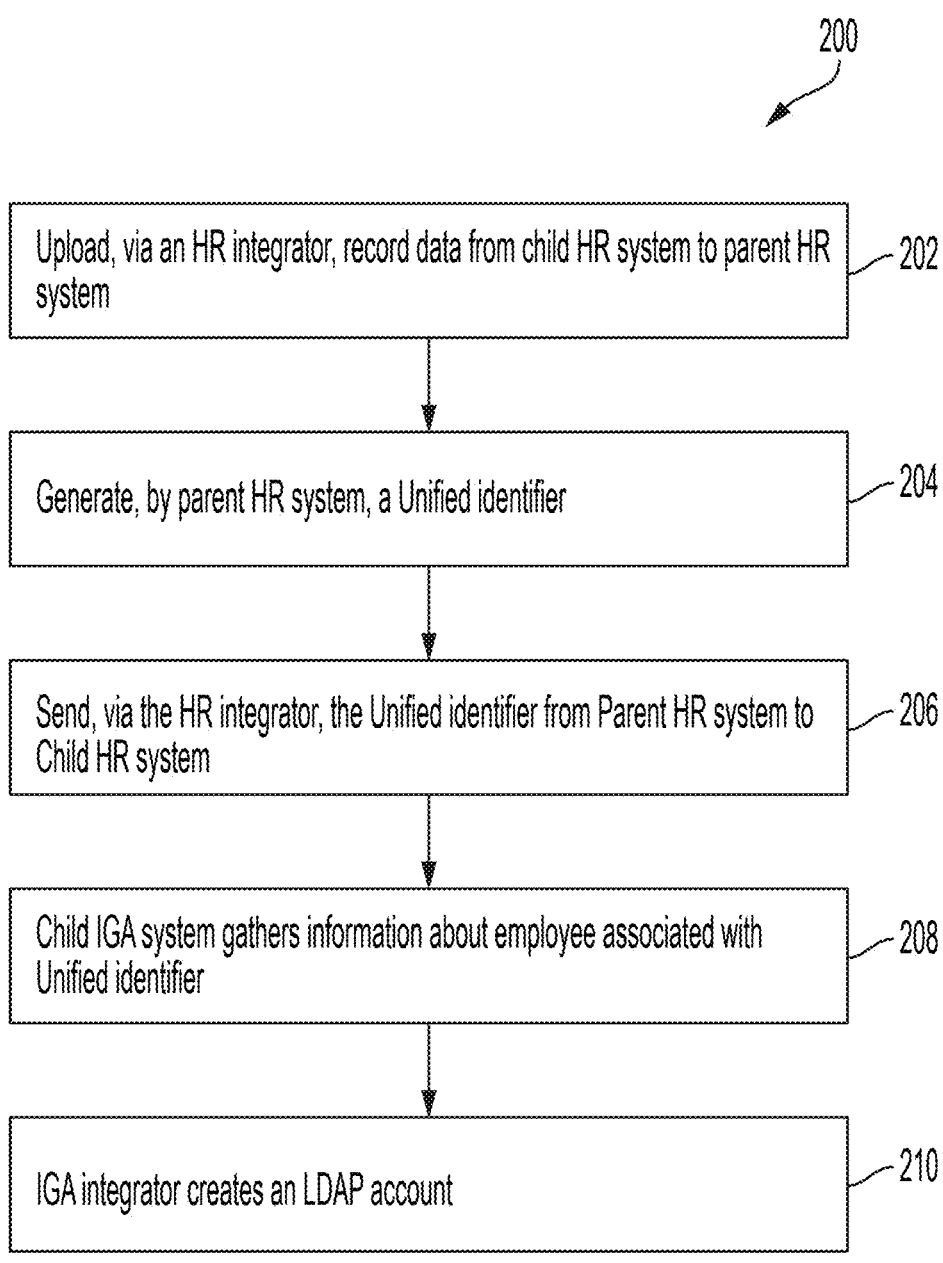
FIG. 2 is a process for operating the distributed computer system, according to an exemplary embodiment of this disclosure.

FIG. 2 is a process 200 for operating the distributed system 100, according to various embodiments of the present invention. The process 200 starts with an employee in the child entity with information to update in a Parent HR system 124. For example, for a new child entity employee (e.g., Joiner), the Child HR system 124 can create new identity records for the Joiner. The Child HR system 124 uploads data for the Joiner to the Parent HR System 120 via the HR integrator 126. For an employee changing positions (e.g., Mover), the Child HR system 124 can upload data for the Mover to the Parent HR System 120 via the HR integrator 126. For an employee leaving the employer (e.g. Leaver), the Child HR system 124 can upload data for the Leaver to the Parent HR System 120 via the HR integrator 126. For a Mover, the Child HR system 124 can update the related information. For a Leaver, the Child HR system 124 can mark the identity of the Leaver as inactive.

At step 202, the HR integrator 126 can upload the record data for the child employee from the child HR system 124 to the parent HR system 120. The Parent HR system 120, at step 204, can generate a Unified Identifier for the employer. For example, this could be done via SaaS or system-to-system connection via the HR integrator 126 deployed in the parent identity to ensure the appropriate segregation.

The Child HR system 124 can receive the Unified Identifier from the parent HR system 120 via the HR integrator 126. The Parent HR system 120 can send, at step 206, the Unified Identifier to the HR integrator 126. The HR integrator can then receive the Unified Identifier and send the Unified Identifier to the Child HR system 124.

At step 208, the Child IGA system can gather information about the employee identified by the Unified Identifier. The Child HR system 124 is in communication with the Child IGA system 114. The Child HR system 124 can utilize the Unified Identifier to gather information of the employee from the Child IGA System 114. For example, a Child IGA system 114 can collect new Joiner information associated with Unified Identifier. For a Mover, the Child IGA system 114 can trigger the worker transfer process such as entitlement certification. For a Leaver, the Child IGA system 114 can trigger the termination process such as revoking the worker entitlements.

At step 210, the IGA integrator 122 can create an LDAP account in the child LDAP system 118, an email account, and other accounts for a Joiner. The child LDAP 118 controls access to child applications 130. A similar process can be applied to Parent Legal Entity. The equivalent IGA control could be on-cloud via cloud Role-Based Access Control (RBAC) provided by the cloud vendor.

In one embodiment, the child and parent users are invited to a collaboration tenant via email. This process utilizes the Identity Federation capabilities provided by the cloud vendor with strict policy control. The collaboration tenant is in communication with the parent IGA system 112 and the collaboration applications 134. In one embodiment, a guest user requests access to resources controlled by the collaboration tenant 136. In one embodiment, the Parent IGA system 114 collects worker identification information from guest users from the Parent entity and collaboration tenant for governance. The worker identification information includes an email and worker ID number.

In one embodiment, the Global IGA integrator 132 performs a background process between Child IGA System and Parent IGA System for reporting purposes.

In one embodiment, the Parent entity does not create an account for child entity users. For example, a Joiner for the Child Entity can be recognized by the parent IGA system 112, but without the Parent LDAP system 116 storing an account for Child Joiner.

The various LDAP systems 116, 118 can store usernames, passwords, email addresses, printer connections, and other static data within LDAP directories for the parent or child, as the case may be. To connect to company data, applications or systems, a user at the parent or child connects to the appropriate LDAP system server via an LDAP port. When the user submits a request to the LDAP system server 116, 118, the LDAP protocol can query its directory, find the information, and deliver it to the user. The user then disconnected from the LDAP port. Before performing the search, the LDAP system 116, 118 can authenticate using, for example, either (i) username and password or (ii) simple authentication and security layer (SASL), such as Kerberos. The LDAP systems 116, 118 can be implemented with dedicated servers running on Linux (e.g., OpenLDAP), Windows Server (Active Directory) or UNIX-based systems.

The various IGA systems 112, 114 can employ various elements for identity governance. To avoid error and prevent fraud, security teams of the parent and child can create rules that prevent risky sets of access or transaction rights from being granted to a single person. For example, segregation of duty (SoD) controls can prevent a user from being able to both view a corporate bank account and transfer funds to outside accounts, either carelessly or with malicious purposes. SoD controls could also be in place within a given application, as well as across multiple systems and identity access management applications.

The IGA systems 112, 114 can also streamline the process to review and verify user access to various apps and resources. They can also simplify access revocation (for example, when a user leaves the organization). The IGA systems 112, 114 can also employ RBAC. With RBAC, user access is determined according to their role, so they can only access the information necessary to perform their job duties. By preventing unnecessary access, especially to sensitive data, RBAC increases enterprise security and prevents breaches. The IGA systems can also provide analytics and reporting so that the security personnel can identify security risks and raise alarms in high-risk situations.

The IGA systems 112, 114 can be implemented with application servers, database servers and/or web servers running appropriate software. The various integrators 122, 126, 132 can be implemented as servers that extract, transform and load (ETL) data between the systems that integrate.

The various computer-based systems 112, 114, 116, 118, 120, 122, 124, 126, 128, 130, 132, 134, 150, 152 may be implemented by one or a number of internetworked computers, such as servers. The systems may also communicate via electronic data network(s) such as the Internet, LANs, WANs, etc. The software for the computer systems described herein may be implemented in computer software using any suitable computer programming language, such as PowerShell, .NET, C, C++, or Python, and using conventional, functional, or object-oriented techniques. The software may be stored or otherwise maintained in computer readable media, e.g., RAM, ROM, secondary storage, etc. One or more processing cores (e.g., CPU or GPU cores) of the computer system may then execute the software modules to implement the functions provided by thereby. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to a distributed computer system for a global enterprise that comprises a parent entity and a child entity, where the parent entity operates in a first country and the child entity operates in a second country that is different from the first country, the distributed computer system comprising: a parent Identity Governance and Administration (IGA) system; a parent HR system in communication with the parent IGA system; a parent LDAP system in communication with the parent HR system; a child IGA system; a child HR system in communication with the child IGA system; a child LDAP system in communication with the child HR system; a child IGA integrator that integrates the child LDAP system and the child IGA system, wherein the child IGA integrator is coupled between the child IGA system and the child LDAP system; and an HR data integrator in communication with the parent HR system and the child HR system, wherein the HR data integrator: shares data between the parent HR system and the child HR system within constraints of laws and regulations of the first and second countries; and generates a unified identifier for an employee of the global enterprise, wherein the unified identifier identifies the employee.

In an embodiment, the HR data integrator is configured to: receive employee data for the employee from child HR system; and upload the employee data to the parent HR system to update the employee data for the employee identified by the unified identifier.

In an embodiment, the HR data integrator is configured to send the unified identifier from the parent HR system to the child HR system.

In an embodiment, the child IGA system is configured to collect information associated with the employee.

In an embodiment, in response to the employee being transferred within the child entity, the child IGA system triggers a worker transfer process.

In an embodiment, in response to the employee being terminated by the global enterprise, the child IGA system triggers a termination process.

In an embodiment, the termination process includes revoking worker privileges for the employee.

In an embodiment, the employee is a new employee, the IGA system collects information associated with the unified identifier.

In an embodiment, the IGA integrator creates at least one LDAP account for the employee.

In an embodiment, further comprising at least one child application, wherein the child LDAP system is configured to control access to the at least one child application for the employee based on unified identifier of the employee.

In an embodiment, further comprising a global IGA integrator coupled between the child IGA system and the parent IGA system, wherein the global IGA integrator is to report.

In an embodiment, in response to child and parent users being invited to a collaboration tenant, the parent IGA system is configured to collect worker identification and email.

In an embodiment, for a new child entity employee: the child HR system creates new identity records for the new child entity employee; the child HR system uploads data for a Joiner to the parent HR System via the HR data integrator; the parent HR system generates the unified identifier for the new child entity employee; the child HR system receives the unified identifier from the parent HR system via the HR data integrator; and the child IGA system collects new Joiner information associated with the unified identifier.

In an embodiment, the child IGA integrator creates an LDAP account in the child LDAP system for the Joiner, wherein the LDAP account controls access by the Joiner to an on-premises child application.

In an embodiment, the new child entity employee is recognized by the parent IGA system and the Parent LDAP system does not store an account for the new child entity employee.

In an embodiment, further comprising a collaboration application.

In an embodiment, a guest user requests access to the collaboration application; and in response the parent IGA system collects an employee identification and email for the guest user from the parent entity.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A distributed computer system for a global enterprise that comprises a parent entity and a child entity, where the parent entity operates in a first country and the child entity operates in a second country that is different from the first country, the distributed computer system comprising a plurality of internetworked computer systems, the plurality of internetworked computer systems comprising:

a parent Identity Governance and Administration (IGA) system;

a parent human resources (HR) system in communication with the parent IGA system;

a parent lightweight directory access protocol (LDAP) system in communication with the parent HR system;

a child IGA system;

a child HR system in communication with the child IGA system;

a child LDAP system in communication with the child HR system;

a child IGA integrator that integrates the child LDAP system and the child IGA system, wherein the child IGA integrator is coupled between the child IGA system and the child LDAP system; and an HR data integrator in communication with the parent HR system and the child HR system, wherein the HR data integrator:

shares data between the parent HR system and the child HR system within constraints of laws and regulations of the first and second countries; and generates a unified identifier for an employee of the global enterprise, wherein the unified identifier identifies the employee, and wherein the HR data integrator is configured to:

receive employee data for the employee from child HR system; and upload the employee data to the parent HR system to update the employee data for the employee identified by the unified identifier.

2. The distributed computer system of claim 1, wherein the HR data integrator is configured to send the unified identifier from the parent HR system to the child HR system.

3. The distributed computer system of claim 2, wherein the child IGA system is configured to collect information associated with the employee.

4. The distributed computer system of claim 3, wherein, in response to the employee being transferred within the child entity, the child IGA system triggers a worker transfer process.

5. The distributed computer system of claim 3, wherein in response to the employee being terminated by the global enterprise, the child IGA system triggers a termination process.

6. The distributed computer system of claim 5, wherein the termination process includes revoking worker privileges for the employee.

7. The distributed computer system of claim 3, wherein the employee is a new employee, the IGA system collects information associated with the unified identifier.

8. The distributed computer system of claim 7, wherein the IGA integrator creates at least one LDAP account for the employee.

9. The distributed computer system of claim 8, further comprising at least one child application, wherein the child LDAP system is configured to control access to the at least one child application for the employee based on unified identifier of the employee.

10. The distributed computer system of claim 1, further comprising a global IGA integrator coupled between the child IGA system and the parent IGA system, wherein the global IGA integrator is to report security risks and alarms.

11. A distributed computer system for a global enterprise that comprises a parent entity and a child entity, where the parent entity operates in a first country and the child entity operates in a second country that is different from the first country, the distributed computer system comprising a plurality of internetworked computer systems, the plurality of internetworked computer systems comprising:

a parent Identity Governance and Administration (IGA) server system;

a parent human resources (HR) server system in communication with the parent IGA server system;

a parent lightweight directory access protocol (LDAP) server system in communication with the parent HR server system;

a child IGA server system;

a child HR server system in communication with the child IGA system;

a child server LDAP system in communication with the child HR system;

a child IGA integrator server that integrates the child LDAP system and the child IGA system, wherein the child IGA integrator is coupled between the child IGA system and the child LDAP system; and an HR data integrator server in communication with the parent HR system and the child HR system, wherein the HR data integrator is configured to:

share data between the parent HR system and the child HR system within constraints of laws and regulations of the first and second countries; and generate a unified identifier for an employee of the global enterprise, wherein the unified identifier identifies the employee; and wherein in response to child and parent users being invited to a collaboration tenant, the parent IGA system is configured to collect employee identification and email.

12. A distributed computer system for a global enterprise that comprises a parent entity and a child entity, where the parent entity operates in a first country and the child entity operates in a second country that is different from the first country, the distributed computer system comprising a plurality of internetworked computer systems, the plurality of internetworked computer systems comprising:

a parent Identity Governance and Administration (IGA) server system;

a parent human resources (HR) server system in communication with the parent IGA server system;

a parent lightweight directory access protocol (LDAP) server system in communication with the parent HR server system;

a child IGA server system;

a child HR server system in communication with the child IGA system;

a child server LDAP system in communication with the child HR system;

a child IGA integrator server that integrates the child LDAP system and the child IGA system, wherein the child IGA integrator is coupled between the child IGA system and the child LDAP system; and an HR data integrator server in communication with the parent HR system and the child HR system, wherein the HR data integrator is configured to:

share data between the parent HR system and the child HR system within constraints of laws and regulations of the first and second countries; and generate a unified identifier for an employee of the global enterprise, wherein the unified identifier identifies the employee;

wherein, for a new child entity employee:

the child HR system creates new identity records for the new child entity employee; the child HR system uploads data for a Joiner to the parent HR System via the HR data integrator;

the parent HR system generates the unified identifier for the new child entity employee;

the child HR system receives the unified identifier from the parent HR system via the HR data integrator; and the child IGA system collects new Joiner information associated with the unified identifier.

13. The distributed computer system of claim 12, the child IGA integrator creates an LDAP account in the child LDAP system for the Joiner, wherein the LDAP account controls access by the Joiner to an on-premises child application.

14. The distributed computer system of claim 12, the new child entity employee is recognized by the parent IGA system and the Parent LDAP system does not store an account for the new child entity employee.

15. A distributed computer system for a global enterprise that comprises a parent entity and a child entity, where the parent entity operates in a first country and the child entity operates in a second country that is different from the first country, the distributed computer system comprising a plurality of internetworked computer systems, the plurality of internetworked computer systems comprising:

a parent Identity Governance and Administration (IGA) server system;

a parent human resources (HR) server system in communication with the parent IGA server system;

a parent lightweight directory access protocol (LDAP) server system in communication with the parent HR server system;

a child IGA server system;

a child HR server system in communication with the child IGA system;

a child server LDAP system in communication with the child HR system;

a child IGA integrator server that integrates the child LDAP system and the child IGA system, wherein the child IGA integrator is coupled between the child IGA system and the child LDAP system; and an HR data integrator server in communication with the parent HR system and the child HR system, wherein the HR data integrator is configured to:

share data between the parent HR system and the child HR system within constraints of laws and regulations of the first and second countries;

generate a unified identifier for an employee of the global enterprise, wherein the unified identifier identifies the employee;

a collaboration application, wherein a guest user requests access to the collaboration application; and in response the parent IGA system collects an employee identification and email for the guest user from the parent entity.

\* \* \* \* \*